United States Patent
Michelsen et al.

(10) Patent No.: US 8,386,393 B2
(45) Date of Patent: Feb. 26, 2013

(54) SYSTEMS AND METHODS FOR VERIFYING IDENTITIES IN TRANSACTIONS

(75) Inventors: Michael J. Michelsen, Arvada, CO (US); Paul Blair, Parker, CO (US); Dean Seifert, Parker, CO (US); Joseph Cachey, Englewood, CO (US)

(73) Assignee: The Western Union Company, Englewood, CO (US)

( * ) Notice: Subject to any disclaimer, the term of this patent is extended or adjusted under 35 U.S.C. 154(b) by 1848 days.

(21) Appl. No.: 10/977,505

(22) Filed: Oct. 29, 2004

(65) Prior Publication Data

US 2005/0119968 A1 Jun. 2, 2005

Related U.S. Application Data

(62) Division of application No. 10/424,558, filed on Apr. 25, 2003.

(51) Int. Cl.
*G06F 17/00* (2006.01)

(52) U.S. Cl. ............................................ 705/64; 705/33

(58) Field of Classification Search .............. 705/50–80; 235/381
See application file for complete search history.

(56) References Cited

U.S. PATENT DOCUMENTS

| | | | |
|---|---|---|---|
| 4,880,097 A | 11/1989 | Speas | |
| 4,882,475 A | 11/1989 | Miller et al. | |
| 5,679,938 A | 10/1997 | Templeton et al. | |
| 5,937,396 A * | 8/1999 | Konya | 705/43 |
| 6,012,048 A | 1/2000 | Gustin et al. | |
| 6,029,150 A | 2/2000 | Kravitz | |
| 6,149,055 A | 11/2000 | Gatto | |
| 6,330,546 B1 | 12/2001 | Gopinathan et al. | |
| 6,547,132 B1 | 4/2003 | Templeton et al. | |
| 6,612,488 B2 | 9/2003 | Suzuki | |
| 6,690,673 B1 | 2/2004 | Jarvis | |
| 6,883,709 B2 * | 4/2005 | Joseph | 235/381 |
| 6,914,517 B2 * | 7/2005 | Kinsella | 340/5.83 |
| 2003/0056113 A1 | 3/2003 | Korosec | |
| 2003/0197782 A1 * | 10/2003 | Ashe et al. | 348/150 |
| 2004/0039702 A1 | 2/2004 | Blair et al. | |
| 2004/0215557 A1 | 10/2004 | Michelsen et al. | |
| 2004/0215574 A1 | 10/2004 | Michelsen et al. | |
| 2005/0096990 A1 | 5/2005 | Algiene et al. | |

* cited by examiner

*Primary Examiner* — Calvin L Hewitt, II
*Assistant Examiner* — John M Winter
(74) *Attorney, Agent, or Firm* — Kilpatrick Townsend & Stockton

(57) ABSTRACT

A computerized method of verifying the identity of an attendant operating a money transfer transaction device includes receiving at the money transfer transaction device a user identification and password from the attendant and receiving at the money transfer transaction device additional information from the attendant. The additional information relates to a security feature that limits access to the transaction device. The method also includes using the additional information, the user identification, and the password to evaluate whether to allow the attendant to operate the transaction device to process a transaction.

12 Claims, 2 Drawing Sheets

SYSTEMS AND METHODS FOR VERIFYING IDENTITIES IN TRANSACTIONS

CROSS-REFERENCES TO RELATED APPLICATIONS

This application is a divisional of and claims the benefit of U.S. patent application Ser. No. 10/424,558 filed on Apr. 25, 2003, by Michael J. Michelsen, et al., the entire disclosure of which is herein incorporated by reference for all purposes. This application is related to co-pending, commonly assigned and concurrently filed Provisional U.S. Patent Application No. 60/465,967, entitled "SYSTEMS AND METHODS FOR PRODUCING SUSPICIOUS ACTIVITY REPORTS IN FINANCIAL TRANSACTIONS," and to co-pending, commonly assigned, and concurrently filed U.S. patent application Ser. No. 10/424,562, entitled "SYSTEMS AND METHODS FOR VALIDATING IDENTIFICATIONS IN FINANCIAL TRANSACTIONS," the entire disclosures of which are incorporated herein by reference for all purposes.

BACKGROUND OF THE INVENTION

The present invention relates generally to money transfer transactions. More specifically, the present invention relates to verifying the identity of persons involved in money transfers.

Many people use the services of money transfer service providers to send funds to other people. Electronic communication and banking networks now allow such transactions to have nearly global reach. Unfortunately, some people use the services of money transfer service providers to transfer money for illegal or unethical purposes. For this and other reasons, it is desirable to provide systems and methods for confirming the identities of persons involved in money transfers. It is also desirable to provide systems and methods that identify money transfer transactions that may be related to one another.

BRIEF SUMMARY OF THE INVENTION

Embodiments of the present invention thus provide a computerized method of verifying the identity of an attendant operating a money transfer transaction device. The method includes receiving at the money transfer transaction device a user identification and password from the attendant and receiving at the money transfer transaction device additional information from the attendant. The additional information relates to a security feature that limits access to the transaction device. The method also includes using the additional information, the user identification, and the password to evaluate whether to allow the attendant to operate the transaction device to process a transaction.

In some embodiments, the step of using the additional information, the user identification, and the password to evaluate whether to allow the attendant to operate the transaction device to process a transaction may include sending the additional information, the user identification, and the password to a host computer system and, at the host computer system, comparing the additional information to stored information. The step of using the additional information, the user identification, and the password to evaluate whether to allow the attendant to operate the transaction device to process a transaction may occur at the money transfer transaction device. The step of receiving additional information may include displaying a stored attendant name together with a question asking the attendant if the stored attendant name is the name of the attendant and receiving a response to the question from the attendant. The step of receiving additional information may include receiving information from an identification tool of the attendant. The identification tool may be a card encoded with machine-readable information. The card may be selected from a group consisting of proximity card, smart card, identification card, and card having a magnetic stripe. The identification tool may include a tool that generates a code, in which case the step of receiving additional information may include receiving the code from the attendant and the step of using the additional information, the user identification, and the password to evaluate whether to allow the attendant to operate the transaction device to process a transaction may include generating a verification code and comparing the verification code to the code. Receiving additional information may include receiving a biometric feature of the attendant. The biometric feature may be selected from a group consisting of DNA, fingerprint, retinal image, voice print, and facial image. Receiving additional information may include receiving a biometric image from an identification card relating to the attendant. The identification card may be selected from a group consisting of driver's license, passport, picture identification card, biometric card, and government-issued identification card. The method also may include limiting the attendant's access based on information specific to a transaction being processed by the attendant.

In another embodiment, a method of obtaining identification information from an individual involved in a transaction includes entering transaction-related information into a transaction processing device. The transaction information includes information relating to the identity of the individual. The method also includes receiving a prompt via the transaction processing device to enter identification information and entering identification information. The identification information may verify the information relating to the identity of the individual. The method also includes processing the transaction. The method may include storing at least a portion of the transaction-related information and at least a portion of the identification information in a transaction record as transaction information. The method also may include comparing the transaction information to information obtained from a credit reporting agency. The method also may include comparing the transaction information to information obtained from an identification information company. The method also may include comparing the transaction information to similar information in other transaction records. The method also may include comparing the transaction information to information in a list provided by law enforcement authorities. The step of processing the transaction may include aborting the transaction. The identification information may include a biometric feature of the sender. The transaction-related information may include information relating to a receiver in the financial transaction. The identification information may be entered by inputting information into the transaction processing device. The identification information may be entered by inputting information into a peripheral device associated with the transaction processing device. The identification information may include a security code obtained from an identification tool. The method also may include comparing the security code to a verification code generated by the transaction processing device.

In still other embodiments, a system for obtaining identification information from an operator of a transaction processing device includes a host computer system and a transaction processing device. The transaction processing device is programmed to receive a user identification and password from the operator and receive additional information from the operator. The additional information may relate to a security feature that limits access to the transaction device. The transaction processing device also is programmed to transmit at least a portion of the information to the host computer system. The host computer system is programmed to use the additional information, the user identification, and the password to evaluate whether to allow the operator to operate the transaction device to process a transaction.

In yet another embodiment, a system for obtaining identification information from a party to a transaction includes a host computer system and a transaction processing device. The transaction processing device is programmed to receive transaction-related information, including information relating to the identity of the party. The transaction processing device also is programmed to receive identification information from the party. The identification information may relate to a biometric feature of the party. The transaction processing device also is programmed to transmit at least a portion of the information to a host computer system. The host computer system may be programmed to store the transaction-related information and the identification information as transaction information and compare the transaction information to similar information relating to other transactions. The host computer system also may be programmed to compare the transaction information to information in a list provided by law enforcement authorities.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
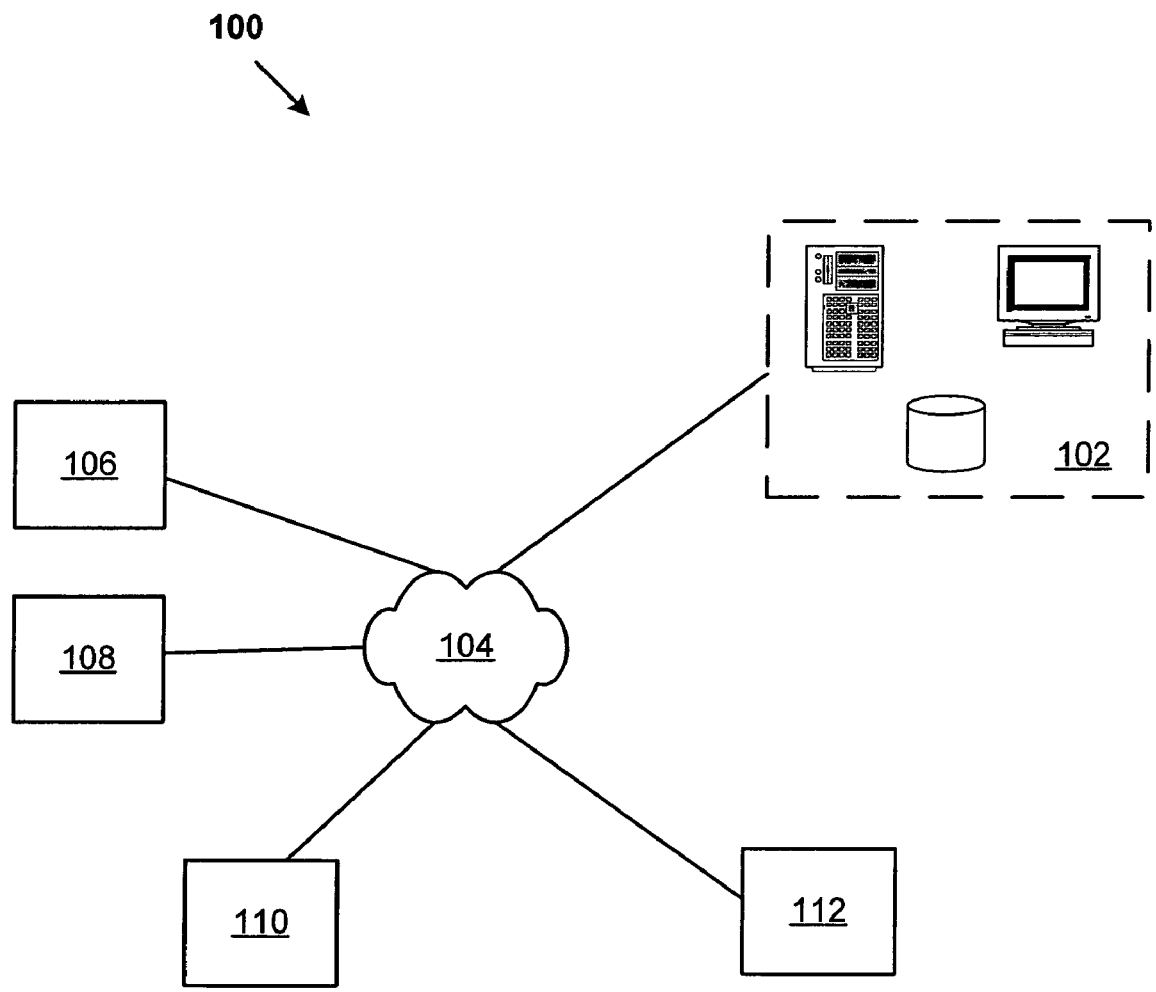
FIG. 1 illustrates a system for processing money transfers according to embodiments of the present invention.

According to the present invention, money transfer service providers employ systems and methods to identify individuals involved in money transfer transactions and/or to relate transactions that otherwise appear unrelated. Herein, "provider" or "service provider" will refer to a money transfer service provider. For example, "provider" may refer to an entity such as Western Union of Englewood, Colo., whose money transfer service is well known. Additionally, "associate" will refer to entities that a money transfer service provider may enlist to accomplish the service. For example, third parties, such as merchants, financial institutions, and the like may be "associates." Herein "attendant" will refer to someone with whom a customer interacts in the transaction process. For example, an attendant may be an employee of a provider or associate. An attendant typically operates a transaction processing device, entering information received from the customer and/or related to a transaction. Further, although the phrase "money transfer" will be used herein to refer to the type of service provided, that phrase will be understood to mean any financial transaction involving "value," which may include money, credits, customer loyalty points, other units of measure, and the like.

Although the present invention will be described primarily in the context of money transfers, other types of transactions also may benefit from the teachings herein. Thus, transactions to which the present invention applies may include money order purchases and/or redemptions, traveler's check purchases and/or redemptions, sending money to a recipient, receiving money from a sender, and the like.

The process of "wiring" money is well known. Briefly, a sender presents himself to a service provider or associate and provides value, usually cash, to an attendant. Some service providers now even allow senders to transfer money by logging on to a web site and initiating money transfers using credit cards or other accounts. In either case, information is entered into a record that is received at a host computer system. The record includes information that identifies the sender, the recipient, and the amount of money being transferred, among other things. The recipient then presents himself to a receive site of a provider or associate to obtain the money or other value. An attendant at the receive site verifies the identity of the receiver and gives the receiver the value.

At the sending end of the transaction, the transaction information may be collected in any number of ways. In some cases, the information is collected by a point-of-sale device specifically designed for money transfer transactions. The device may be operated by an attendant employed by the provider or an associate. In another case, the information may be collected using a computing device running application software specifically designed for money transfer transactions. In yet another case, the information may be collected by phone when an attendant contacts a customer service representative (CSR) of the provider. The attendant is able to verify the sender's information and collect funds while the CSR enters the information into a transaction record. It also may be the case that the transaction is initiated by an associate who then must contact a CSR because the transaction exceeds certain thresholds. In yet another example, the customer provides some information to a CSR at a remote location while also entering some information into a transaction processing device by, for example, "swiping" a card through a reader on the device. Other examples are possible.

For a number of reasons, identity verification is a significant aspect to the money transfer process. For example, in one instance, it is important to verify the identity of the sender. In an attempt to thwart illegal or unethical money transfers, it is helpful to confirm the identity of a sender, especially on transfers over certain value thresholds. Transfers over the thresholds may require the provider to obtain additional information from the sender. In some cases, the information may be compared to a list of known or suspected criminals. If a sender is a known criminal, identifying transactions initiated by the individual may provide security and law enforcement personnel assistance in stopping criminal activity such as money laundering, criminal activity funding, and tax evasion. Further, some individuals may attempt to avoid detection by segmenting a single money transfer into multiple smaller transfers below the thresholds. Thus, providers may employ measures described herein to relate transactions that might otherwise appear unrelated.

In another instance, it is important to verify the identity of persons performing the transaction, particularly attendants employed by a provider or an associate. The equipment used in money transfer transactions may be subject to misuse to perform illegal transactions. For this reason, it is important to verify the identity of those using the equipment.

For the foregoing reasons, the present invention provides systems and methods to identify potentially related transactions and to verify the identities of those involved in money transfer transactions, both as sending parties, receiving parties, and as transaction device operators (e.g., attendants).

Attention is directed to FIG. 1, which illustrates a money transfer system 100 according to embodiments of the present invention. The system 100 includes a host computer system 102 and a network 104. The host computer system 102 may include, for example, server computers, personal computers, workstations, web servers, and/or other suitable computing devices. The host computer system 102 includes application software that programs the host computer system 102 to perform one or more functions according to the present invention. For example, application software resident on the host computer system 102 may program the host computer system 102 to process money transfer records according to embodiments of the present invention. The host computer system 102 may include one or more of the aforementioned computing devices, as well as storage devices such as databases, disk drives, optical drives, and the like. The storage devices may include solid state memory, such as RAM, ROM, PROM, and the like, magnetic memory, such as disc drives, tape storage, and the like, and/or optical memory, such as DVD. The host computer system 102 may be fully located within a single facility or distributed geographically, in which case a network may be used to integrate the host computer system 102. Many other examples are possible and apparent to those skilled in the art in light of this disclosure.

The network 104 may be the Internet, an intranet, a wide area network (WAN), a local area network (LAN), a virtual private network, any combination of the foregoing, or the like. The network 104 may include both wired and wireless connections, including optical links. In some embodiments, the network 104 is a transaction processing network. Through the network 104, transaction devices communicate with the host computer system 102.

The system 100 also includes one or more Point-of-Sale (POS) devices 106. POS devices are more fully described in U.S. patent application Ser. No. 09/634,901, filed on Aug. 8, 2000, the entire disclosure of which is incorporated herein by reference for all purposes. Essentially, POS devices are terminals for receiving transaction information and sending the information to a host computer system. For example, a POS may receive transaction information by capturing it from a card using a reader integral to or associated with the POS. A POS also may receive information from an attendant or customer via a keypad, keyboard, and/or other input device. Other examples are possible. POS devices are typically located at associate or provider locations offering money transfer services.

The system 100 also may include one or more computing devices 108 programmed to receive money transfer information from customers or attendants. Like the POS devices 106, the computing devices 108 may be located at associate locations.

The system also may include one or more Customer Service Representative (CSR) computers 110. The CSR computers 110 may be located, for example, at a call center operated by the service provider or an associate. The CSR computers 110 function much like the POS devices 106 and the computing devices 108, except that transaction information is entered by a CSR who is receiving the information from a customer by phone, for example. In some examples, a voice response unit may receive some or all of the information.

The system 100 also includes one or more receiving sites 112 from which customers may receive funds. The receive sites 112 may be associate locations equipped with a POS 106 or computing device 108. The receive sites also may be automated teller machines, kiosks (which are more fully described in U.S. patent application Ser. No. 10/225,410, filed on Aug. 20, 2002, the entire disclosure of which is incorporated herein by reference for all purposes), merchant store fronts, bank accounts, stored value accounts, and/or the like.

According to the present invention, a customer presents himself to a money transfer location. The location may be equipped with either a POS device 106, a computing device 108, or other suitable transaction device. The location may be operated by the provider or an associate. An attendant receives information from the customer and verifies it according to embodiments of the present invention. The attendant also enters the information into the transaction device. In the process, the attendant may need to enter his own identification information to enable the device. If necessary, the attendant contacts a CSR to complete the transaction. The attendant also collects the money from the customer.

Once entered into a record, the transaction information may be compared with information in other transaction records to attempt to identify potentially related transactions. Identity information collected in the course of identifying the sender may be used for this purpose. If potentially related transactions are identified, they may be flagged for increased scrutiny.

One specific scenario relating to tracking transactions deserves more detailed explanation. In this scenario, a customer initiates a transaction by providing an attendant with transaction information. The attendant enters the information into a transaction device, as previously described. When the attendant attempts to complete the transaction, a message alerts the attendant that the transaction must be completed by a CSR. This may be because the transaction exceeds certain thresholds or otherwise triggers a flag. Thus, the attendant contacts a CSR who also collects the transaction information from the customer and who may ask the customer for additional information. If at any time the customer elects to abort the transaction, any information collected up to that point may be stored for future use. The theory being that the customer may, in the future, attempt to avoid the flag that triggered the need for the additional information. For example, the customer may attempt to initiate several smaller transfers from different money transfer locations to avoid a trigger based on the amount of the transaction. By storing the unprocessed transaction record, the provider may search other transactions for similar information and identify any found as being potentially related to the aborted transaction.

Having described a system according to the present invention, the remainder of this description will focus on methods for verifying the identity of persons operating money transfer equipment and the identity of those sending money.

Confirmation of Identity of Persons Performing a
Transaction (e.g., Associate Personnel)

The identities of persons operating transaction devices (i.e., attendants) may be confirmed in a number of ways. In a first example, the attendant may be required to use an identification tool that may be supplied by the provider. The identification tool either supplies information that the attendant enters into the transaction device, or the identification tool itself may be swiped or otherwise interfaced to the transaction device. This may be combined with entering a user ID and password, in some examples. In a basic example, the attendant swipes a card with a magnetic stripe through a reader on the transaction device or associated with it. The stripe may include the attendant's user ID and password or other information known only to the user. The transaction device then may prompt the attendant to enter a user ID followed by a password. If the information is not consistent, is not recognized, or does not match information on record (e.g., stored at a host computer system), the attendant may be denied access to the device. Of course, the steps of swiping a card, entering a user ID, and entering a password may be carried out in other orders than described above.

It is not necessary that the identification tool be a card with a magnetic stripe supplied by the provider. In other examples, the tool may be any card used by the attendant that the attendant elects to use as his identification card for this purpose. During an enrollment process, the attendant elects the card he will use, and his user ID and password are associated with information read from the card. The information is then saved in an access file at either the host computer system or the transaction device for later comparison to information entered by the attendant at the time access is requested. For example, the card may be one of the attendant's credit cards, his driver's license, passport, or the like. In other examples, the identification tool may be a card with other magnetic encoding properties, such as a proximity card (i.e., a card or other device that transfers information when held in proximity to a reader), or it may be a card with a barcode, a smart card, or the like. In still other examples, the tool is not a card but is a biometric feature of the attendant such as his fingerprint, retinal image, facial features, voice print, DNA, or the like. In yet another example, the tool itself generates information that is either displayed to the attendant or entered into the transaction device. The information may be unique each time the attendant attempts to access the device. The information may be generated by an algorithm and compared to information generated at the host computer system or the transaction device using the same algorithm. If the information does not match, then the attendant is denied access.

The identity verification process may be preceded by a registration process wherein information about an attendant is verified, biometric information is obtained, identification cards are selected, and/or the like. For example, during registration, the provider may verify that the attendant actually works for an associate who has authorized the attendant to process transactions. In some examples, a background check is performed on the attendant that may include residence and citizenship verification, criminal background checks, credit verification, and the like. The registration information may then be saved for later use during identity verification associated with a transaction. In some examples, registration includes establishing an attendant's certification level, as will be described further below.

In order to make the process less cumbersome, attendants may be required to provide the information periodically, instead of every day or every transaction. For example, an attendant may be "audited" only once a week, after a particular number of transactions, upon demand by the provider, and/or after a particular dollar volume of transactions. In the case of audits performed on demand, the audit may be on all attendants in a state, all attendants in an associate's network, all attendants at a particular location, or on only selected attendants. In the case of audits performed periodically, an attendant may be required to provide the audit information only after a timeout between transactions or a series of transactions. Audits may be location specific and may be controlled (i.e., called for) by the provider, an associate, or other entity. The audit may be prompted by either the transaction device or the host computer system. In response to an audit prompt, an attendant may be required to provide any of the identifying information explained above. In some examples, the audit may simply be a question displayed to the attendant asking, "Are you John Doe?" wherein "John Doe" may be a name stored in an access file and related to the user ID and/or password entered by the attendant. Other such examples are possible.

In some examples, the identification tools may enable user-level privileges. For example, if an associate issues its employees ID cards, those ID cards may function as an identification tool. However, the associate of the provider may specify the level of access allowed each individual user. Some users may not have access. Others may have access only during certain times of the day or for only transactions below certain value thresholds. The thresholds may be cumulative during a period of time, such as a shift, a day, a week, a pay period, or the like. Some users may be allowed to process only certain types of transactions.

Identification systems also may be combined with certification training to restrict access to attendants based on their level of training. Training may be accomplished in a number of well known ways, and access files relating to each attendant may be updated as an attendant receives additional training. In some embodiments, the certification levels may be established so as to mirror regulatory training and certification requirements. Thus, systems such as the present invention may be used to demonstrate compliance with the regulations.

The verification of attendant information may take place at the host computer system level or at the transaction device level. If at the host level, individual attendant information may be associated with a particular transaction device or devices. Thus, when the device transmits the identification information to the host, it also transmits its own identification information. If the attendant is not authorized to use the device, the attendant is denied access. In another example, the transaction device itself performs the identification verification process. This reduces the amount of information that must be transmitted back to the host computer.

In yet another example, the attendant may be asked to enter his full name and/or an answer to a secret question using an alphanumeric keyboard or a number pad associated with the transaction device. This may be used in combination with a user ID and/or password.

In another example, the attendant's facial biometric may be imaged at the time the attendant registers. The facial biometric may be obtained from the attendant directly or from a document of the attendant, such as a driver's license or passport. The image is then saved in an access file at the host or at the transaction device. When the attendant attempts to execute a transaction, the transaction device may obtain another image of the attendant's facial biometric, either from the attendant directly or from his identification document. The new image is compared to the image taken during enrollment, and, if dissimilar, the attendant is asked for additional information or is denied access to the transaction device. In some embodiments, the image comparison may be done automatically using a software algorithm or the like. In other examples, the comparison may be accomplished manually by an individual. A similar process may be employed that uses the attendant's voice pattern as the biometric. A verification voice sample may be obtained during registration and stored for comparison to a sample obtained during a transaction. A microphone associated with a transaction device may receive a voice sample from the attendant during a transaction and compare the two. Methods for digitizing and comparing voice samples are known.

Another method for limiting access to transaction devices would be through the use of location-specific cards. In a manner similar to the use of other identification cards, each attendant could be issued a card specific to transaction devices at the location at which the attendant works. The card may be configured using, for example, position determination features, such that the card only works inside the facility. Transaction devices may be similarly enabled to only function at a specified location. In another example, the transaction devices may require the entry of a location-specific identification number or character string upon startup. Thus, if the device is stolen, the number must be entered before the device will operate.

Confirmation of the Identity of a Party to a Transaction

Customers desiring to perform transactions may be identified in a number of ways, and the type of identification information collected may be triggered by specifics of the transaction. For example, different identification information may be collected depending on the type of transaction, the number and value of transactions originating from the same sender, even if from different locations or providers, the value of the transaction, the origin location of the transaction, the destination of the transaction, the customer's history of transactions using the provider, the number and value of transactions sent to the same receiving party, and the like. Identification information may include biometric information, such as the customer's fingerprint, retinal image, facial features, voice print, DNA, or the like. The transaction device also may scan a picture identification of the customer, such as the customer's driver's license or passport photo. The biometric or photo identification information may be stored at the host computer system for comparison to future transactions and/or compared to national or international databases of suspect individuals.

In another example, identification information supplied by the customer may be compared to identification information relating to the customer from a credit reporting agency or other entity that provides identify information. If the information is not consistent, the transaction may be denied or additional information may be required from the customer.

Figure 2:
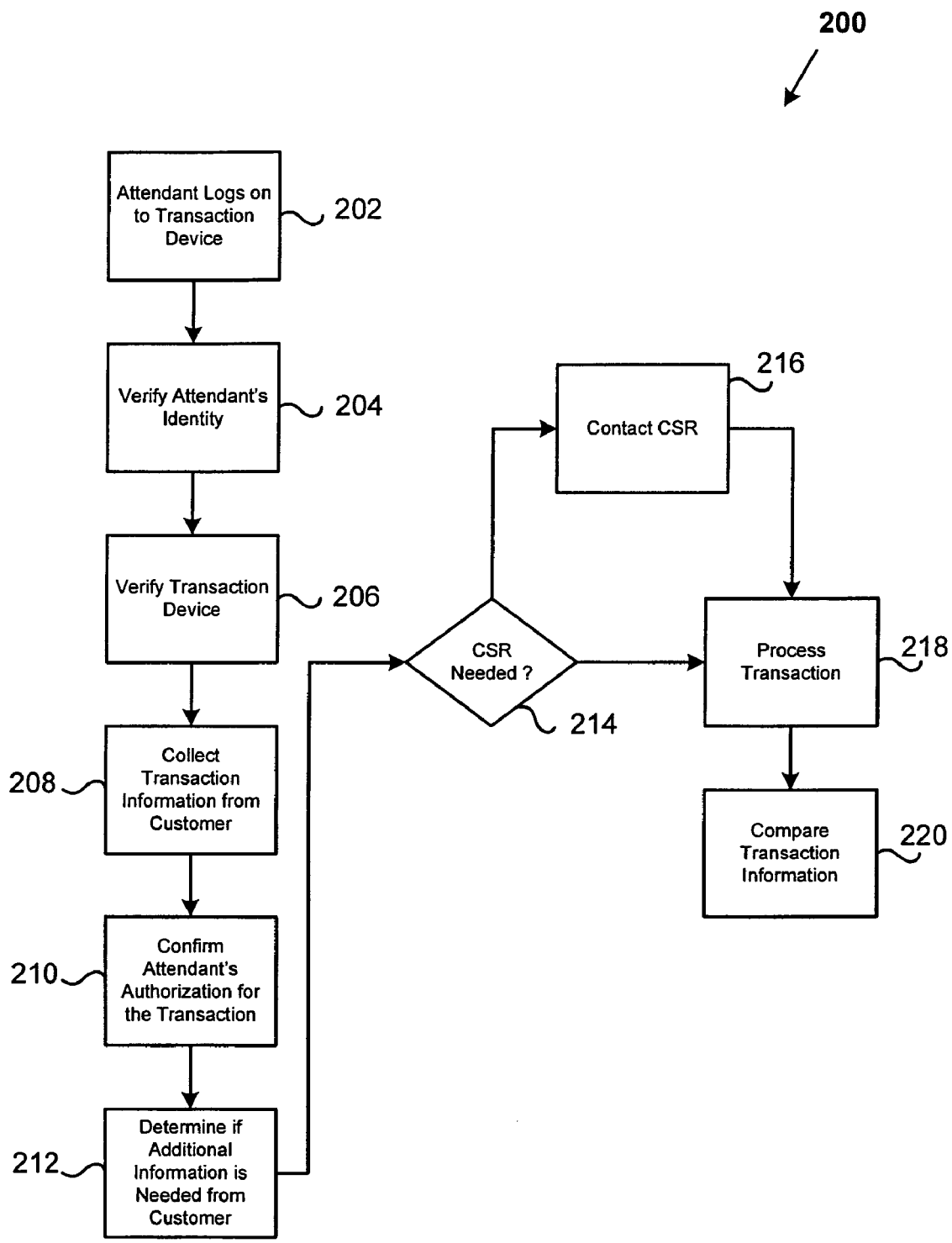
FIG. 2 illustrates a method of verifying identities and identifying related transactions according to the present invention.

Attention is now directed to FIG. 2, which illustrates a method 200 of verifying identities and identifying related transactions according to embodiments of the present invention. The method may be implemented in the system 100 of FIG. 1 or other suitable system. At block 202, an attendant logs into the transaction device. The transaction device may be a POS, a computing device, or other suitable transaction device, as previously described. Logging on to the device may involve merely powering up the device. However, logging on also may involve entering a location identification number, entering a user ID and/or password, answering a secret question, entering biometric information, swiping a card, using a proximity card, and the like, all of which procedures were explained previously.

At block 204, any information entered by the attendant is verified, either by the transaction device itself or by sending information to a host computer system. If the information is accepted, the attendant is granted access to the transaction device. It may be the case, that the host computer system or the transaction device itself determines that an audit of the attendant is necessary, in which case the attendant is asked to provide additional information as previously described.

At block 206, the transaction device may be verified. For instance, the transaction device itself or the host computer system may verify that the transaction device is operating properly and from an authorized location. This may include determining that the device is connected to an authorized network or that the device's physical location is within an allowed range using a positioning system or the like.

At block 208, the attendant collects transaction information from a customer. This may include the customer's name and address, the amount of money involved in the transaction, the recipient's name and address, and the like. This operation also may involve obtaining biometric information from the customer. In some examples, some or all of the information may be provided by the customer via a phone call to a CSR. Thus, a partial transaction record may exist for a transaction when the customer presents himself to the provider or associate location.

At block 210, the attendant's authorization to process the transaction is verified. This may involve verifying the attendant's level of training, the attendant's level of authorization, the attendant's identification information, and/or the like. If not previously obtained or if sufficient time has passed, this operation may involve collecting identification information from the attendant, including biometric information, as necessary. If the attendant is not authorized to process the transaction, then a different attendant or a CSR may be required to complete the transaction.

At block 212, it is determined whether additional information is needed from the customer and the information is collected. Depending on the location from which the transaction originates, the purpose or type of transaction, the destination to which the transaction is directed, the amount of the transaction, and/or other criteria, additional information may be required from the customer. The additional information may include the customer's date of birth, social security number and/or tax identification number, occupation, the type of identification the customer has presented to verify his identity, the place the identification was issued, and/or the like. The additional information also may include biometric information as previously described.

At block 214, it is determined whether a CSR is required to complete the transaction. Again, depending on the type of transaction, the amount of the transaction, the originating location of the transaction, the destination of the transaction, and/or other criteria, a CSR may be required to complete the transaction.

At block 216, the CSR is contacted and the CSR obtains the necessary information from either the attendant or the customer. At block 218, the transaction is processed.

Information collected from the customer may be saved into a transaction record at any point in the process described above, even if the transaction is not completed. In fact, if a customer aborts a transaction upon being asked to provide additional information, this may be an indication that the transaction relates to fraudulent or illegal activity. Thus, even incomplete transaction records are saved for further evaluation according to embodiments of the present invention. It may also be the case that the transaction warrants or requires the completion of a suspicious activity report that then may be transmitted to security and/or law enforcement authorities. Such reports and processes for creating them are more fully described in previously incorporated U.S. patent application Ser. No. 60/465,967.

At block 218, transaction information from various transaction records are evaluated and compared. By doing so, providers are able to identify potentially related transactions. The transactions may be related because they involve the same sender, the same recipient, the same origin and destination, and/or the like. The comparisons may be accomplished by comparing transaction information, including identification information relating to the sender, such as the sender's name and address, identification numbers, biometric information, and/or the like. If transactions are found to be related, it may be determined that the transactions were specifically crafted by the sender to attempt to avoid detection, which may be an indication of illegal or fraudulent activity. Thus, upon detection of such related transactions according to the present invention, providers may alert appropriate authorities.

Upon detection of information that warrants further investigation, a number of things may happen. For example, the host computer system may send an alert to the location where the transaction originated, either through the transaction device or otherwise, that a suspicious activity report needs to be processes. This alert may be in real time or may be delayed. In some cases, the host computer system may retain the transaction information for further comparisons. In some examples, the host computer system may send a message via the transaction processing device that the customer needs to contact the provider to complete the transaction. In still other examples, the host computer system may alert the attendant to contact the provider with a transaction number that the host computer supplies via the transaction device. Thus, while the customer is still at the location, the attendant can answer questions from the provider relating to the transaction and the identity of the customer. In any of the aforementioned examples, the transaction may be denied or suspended until other steps are taken, such as verification of the sending party's identity.

Identification information relating to parties to transactions also may be saved for comparison to future transactions and/or may be compared to lists of suspect individuals provided by authorities. Lists of suspect individuals, may be maintained locally at transaction devices or on servers or computing devices at associate locations. Alternatively, these databases may be located at a host computer system. In either case, the lists may be updates periodically, as needed. Block 218 also includes these types of comparisons.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to wire transfer transaction. For example, the present invention may be used to verify identities in other transactions, such as money order purchases, value card redemptions, other exchanges, or value, and the like. Accordingly, the above description should not be taken as limiting the scope of the invention, which is defined in the following claims.

What is claimed is:

1. A computer-implemented method of obtaining identification information from an individual involved in a money transfer transaction, comprising:
   receiving by a transaction processing device transaction-related information, including information relating to the identity of the individual, wherein the individual comprises one of a sender of money to a recipient of money in a wire transfer of the money or the recipient of money in a wire transfer of money;
   displaying by the transaction processing device a prompt on the transaction processing device to enter identification information;
   receiving by the transaction processing device identification information, wherein the identification information verifies the information relating to the identity of the individual;
   storing at a host computer at least a portion of the transaction-related information and at least a portion of the identification information in a transaction record as transaction information;
   using by the host computer the information relating to the identity of the individual to identify other transaction records relating to the same sender of money or the recipient of money in a wire transfer of money;
   and processing by the host computer the transaction.

2. The method of claim 1, further comprising, comparing the information relating to the identity of the individual to information obtained from a credit reporting agency.

3. The method of claim 1, further comprising, comparing the information relating to the identity of the individual to information obtained from an identification information company.

4. The method of claim 1, further comprising comparing the information relating to the identity of the individual to information in a list provided by law enforcement authorities.

5. The method of claim 1, wherein the step of processing the transaction comprises aborting the transaction.

6. The method of claim 1, wherein the identification information comprises a biometric feature of the sender.

7. The method of claim 1, wherein the transaction-related information also includes information relating to a receiver in the financial transaction.

8. The method of claim 1, wherein the identification information is entered by inputting information into the transaction processing device.

9. The method of claim 1, wherein the identification information is entered by inputting information into a peripheral device associated with the transaction processing device.

10. The method of claim 1, wherein the identification information comprises a security code obtained from an identification tool, and wherein the method further comprises comparing the security code to a verification code generated by the transaction processing device.

11. A system for obtaining identification information from an operator of a money transfer transaction processing device, comprising:
   a host computer system; and
   a transaction processing device that is programmed to:
      receive a user identification and password from the operator;
      receive additional information from the operator, wherein the additional information relates to a security feature that limits access to the transaction device; and
      transmit at least a portion of the information to the host computer system;
   wherein the host computer system is programmed to use the additional information, the user identification, and the password to evaluate whether to allow the operator to operate the transaction device to process a transaction, wherein the transaction comprises a wire transfer of money from a sender to a recipient.

12. The method of claim 1, wherein comparing the transaction information to similar information in other transaction records comprises comparing the transaction information to similar information in a transaction record relating to an aborted transaction.

* * * * *